US012653748B2

(12) United States Patent
Rodriguez

(10) Patent No.: US 12,653,748 B2
(45) Date of Patent: Jun. 16, 2026

(54) HIP CPM MACHINE

(71) Applicant: Michelle C. Rodriguez, New York, NY (US)

(72) Inventor: Michelle C. Rodriguez, New York, NY (US)

( * ) Notice: Subject to any disclaimer, the term of this patent is extended or adjusted under 35 U.S.C. 154(b) by 761 days.

(21) Appl. No.: 18/012,892

(22) PCT Filed: May 31, 2022

(86) PCT No.: PCT/US2022/031653
§ 371 (c)(1),
(2) Date: Dec. 23, 2022

(87) PCT Pub. No.: WO2022/256348
PCT Pub. Date: Dec. 8, 2022

(65) Prior Publication Data

US 2023/0263686 A1 Aug. 24, 2023

Related U.S. Application Data

(60) Provisional application No. 63/246,903, filed on Sep. 22, 2021, provisional application No. 63/195,254, filed on Jun. 1, 2021.

(51) Int. Cl.
*A61H 1/02* (2006.01)

(52) U.S. Cl.
CPC ... *A61H 1/0244* (2013.01); *A61H 2201/0157* (2013.01); *A61H 2201/0161* (2013.01);
(Continued)

(58) Field of Classification Search
USPC .............................................................. 601/5
See application file for complete search history.

(56) References Cited

U.S. PATENT DOCUMENTS 3,783,282 A * 1/1974 Hoppenstein ........ A61B 6/4476 378/146
8,784,343 B2 7/2014 Bonutti et al.
(Continued)

FOREIGN PATENT DOCUMENTS

CN 111467183 A 7/2020
WO 2020/185930 9/2020

OTHER PUBLICATIONS

Written Opinion for PCT/US2022/031653 dated Nov. 3, 2022.
Supplemental European Search Report for EP22816741 dated Feb. 26, 2025.

*Primary Examiner* — Paige Kathleen Bugg
(74) *Attorney, Agent, or Firm* — Christopher Casieri

(57) ABSTRACT

A method and device or machine for safely providing or performing the motion of circumduction as well as linear hip flexion/extension to a patient in need is provided. The device or machine (used interchangeable herein) is preferably a continuous passive movement device. The device gives full support to the operative leg and controls the true amount of hip external/internal rotation by keeping the hip in a neutral position, relative to rotation. In operation, the patient is typically in a side-lying position with the operative leg on top. In this position, the motion of circumduction as well as linear hip flexion/extension can then be performed on the patients safely and effectively. Other positions of the patient can be used and will usually be patient specific.

12 Claims, 12 Drawing Sheets

(52) U.S. Cl.
CPC ................ *A61H 2201/0192* (2013.01); *A61H 2201/1642* (2013.01); *A61H 2201/1659* (2013.01); *A61H 2201/1664* (2013.01); *A61H 2201/1673* (2013.01); *A61H 2201/5007* (2013.01); *A61H 2203/0475* (2013.01)

(56) References Cited

U.S. PATENT DOCUMENTS

| | | | | |
|---|---|---|---|---|
| 9,901,505 | B2 | 2/2018 | Bombard | |
| 10,159,619 | B2 | 12/2018 | Lee et al. | |
| 2013/0204168 | A1* | 8/2013 | Bombard ............... | A61H 1/006<br>601/5 |
| 2018/0303695 | A1 | 10/2018 | Loduca | |
| 2020/0206558 | A1* | 7/2020 | Lefkovitz ................ | A61H 3/04 |
| 2020/0390630 | A1* | 12/2020 | Ferro ................. | A61G 13/1245 |

* cited by examiner

HIP CPM MACHINE

BACKGROUND

The orthopedic field of hip preservation has grown tremendously in the past two decades. Very sophisticated surgeries are now being performed through arthroscopy at the hip joint. The hip joint is a ball and socket joint that has 3-degrees of motion, which means the hip moves not only linearly but also rotates. The post-operative rehabilitation of these patients is instrumental in the surgical and patient outcomes regarding pain, mobility and ultimately function.

One of the most significant and common post-operative complications is the formation of scar tissue and adhesions in the joint and surrounding soft tissue. Currently, continuous passive movement (CPM) machines or device (used interchangeably herein) are used post-operatively in an effort to help minimize scar tissue production and help prevent formation of adhesions between joint capsule and labrum.

The benefits of continuous passive movement are significant. Among the many benefits are that CPM helps to avoid joint stiffness in the first few days/weeks post-surgery, which in turn decreases the chance of progression to fibrosis of the joint. Further, CPM can increase synovial fluid in joint space, improve joint ROM by preventing soft tissue contractures, and improve active hip range-of-motion (ROM) (specifically hip abduction). CPM also helps with maintenance of articular cartilage, relieves pain and helps reduce muscle spasm. Other benefits include the assistance in the stimulation of tissue remodeling and enhanced nutrition, the minimization of joint hemarthrosis and periarticular edema and the decrease in the need for joint manipulation under anesthesia.

A post-operative hip joint ideally requires a motion that is not only linear but also rotational, commonly known as Hip Circumduction (HC), so that the full functional mobility of the joint is addressed. Post-operatively, patients need to complete a significant number of hours (4-6 hours typically) of CPM use on a daily basis. Typically, this treatment is required for the first 4-6 weeks after surgery. In some instances, involving micro-fracture treatment to the joint, CPM is recommended for up to 12 weeks post-operatively.

Currently, there are machines or devices that assist or provide linear motion to the hip joint. However, there are no medical devices that provide the critical circumduction of the hip. Instead, post-operative patients must use a knee CPM machine, which is severely limited in the movement it provides. These prior art knee CPM machines major disadvantage is that it provides only linear (hip flexion/hip extension) movement while the patient lies on their back (supine).

As a result, the HC motion must currently be provided by a licensed physical therapist. This is typically provided when the patients go to the therapist office for his/her physical therapy sessions. As a practical matter, these physical therapy sessions are typically scheduled only 3 times per week. Additional HC motion sessions should ideally be performed at a minimum of 6 times per day in at least 20 minute sessions. But this is often impractical or insufficient. These at-home sessions are typically provided by a caregiver at home that is unlicensed and, generally, insufficiently trained. The home caregiver is typically trained by the medical team on how to perform HC and is then asked to do this for 4-6 weeks.

Unfortunately, for a variety of reasons this arrangement leads to a high degree of non-compliance. First, the HC motion is physically challenging to perform and at-home caregivers tire very easily due to the strain of lifting the leg fully and a general unfamiliarity with the routine. Second, the patients usually have a poor ergonomic set up at home, which makes a difficult situation more challenging. Third, both patients and caregivers often have a low level of confidence that the motion (HC) is performed properly and adequately. These factors and others add up to produce poor compliance with the HC motion and poorer long-term outcomes as a result.

The prior movement machines all have significant drawbacks. Some post-operative patients attempt to use an infant device known as the Mamaroo in order to provide HC motion. In practice, patients fill the device with pillows or other soft material and then place their operative leg on top of it. The significant drawback to this technique is that it provides only a very small, minimal amount of rotation. The Mamaroo is designed as an infant seat that moves. As such, it is not safe to place it on a bed or table; patients instead attempt to get down onto the floor to use it and then safely get up off the floor while using 2 crutches, a hip brace and only apply 20 pounds of weight-bearing (WB) pressure through their operative leg.

There is a need for a device that allows for patients to safely receive both linear motion of hip flexion/hip extension and the rotational motion of hip circumduction. There is a need for a device that provides the rotational motion of hip circumduction to a patient while lying in their bed or on a physical therapy table.

SUMMARY

A method and device or machine for safely providing or performing the motion of circumduction as well as linear hip flexion/extension to a patient in need is provided. The device or machine (used interchangeable herein) is preferably a continuous passive movement device. The device gives full support to the operative leg and controls the true amount of hip external/internal rotation by keeping the hip in a neutral position, relative to rotation. In operation, the patient is typically in a side-lying position with the operative leg on top. In this position, the motion of circumduction as well as linear hip flexion/extension can then be performed on the patients safely and effectively. Other positions of the patient can be used and will usually be patient specific.

According to the invention, the patient typically lies on his or her side with the operative leg on the top. In this position, it is convenient to consider the Y-axis to be along the length of the body (head to feet), the X-axis to be the plane from the front of the body to the back of the body, and the Z-axis extends from the ceiling to the floor or through the vertical height of the pelvis. In this position, the method and hip CPM device safely generates motion of the patient's leg along all three (X, Y and Z) axes. Again, other positions are possible for the patient to be in, which will depend on the condition and needs of the patient. The arms of the device provide the necessary movement of the patient's leg that accurately simulates the movement of the patient's leg that a physical therapist would provide. Specifically, the CPM machine of the present invention creates multidimensional movement of the patient's hip as well providing the necessary therapeutic movement in a home or other environments, such as in and out-patient clinics.

The significant advantage of the present invention is that the patient no longer needs to depend on another person, i.e., medical professionals at an office or caregivers at home, to offer this CPM treatment. Further, the patient does not need multiple machines to achieve the necessary movements of the leg after hip surgery. Instead, a patient will need only one device to perform both necessary motions (Hip flexion/extension & Hip Circumduction). The patient will be able to get into and out of the hip CPM independently. Moreover, physical therapy clinics will be able to use the hip CPM instead of physical therapists manually performing this motion for 20 minutes of the patient's therapy session.

In some embodiments the CPM machine is adjustable in height and the components can fold in or fold down on itself towards the main body of the device. In the folded position the machine is compacted to a smaller and more convenient shape such that it is easily transportable, to patient's homes for example. Internally, the machine contains the means to move the arms in an orbital pattern along an oblong-type axis with the necessary mechanics/engineering that moves the leg in a circumduction, in both a clockwise and counterclockwise, manner as well as into hip flexion/extension. The movement generated will be three dimensional allowing for the robotic arm or arms to move towards and away from the body (X-axis, hip & knee flexion/extension), up towards the head and down towards the feet (Y-axis, hip & knee flexion/extension) and up and down towards the ceiling/floor (Z-axis, hip abduction/adduction).

DETAILED DESCRIPTION

Figure 1A:
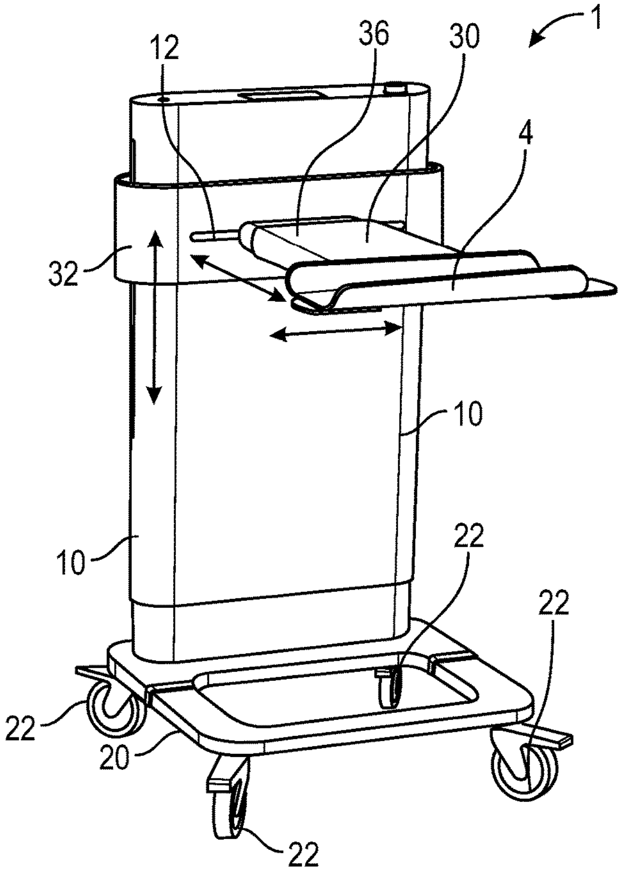
FIGS. 1A-1B show perspective views of a single arm embodiment of the hip CPM machine of the present invention with an elongated hand.

Referring to the FIGs, embodiments of the hip CPM machine or device 1 are illustrated. The main body 10 is generally a rectangular shaped housing containing the means to move the arms e.g., the motor, gears, actuators etc. of the CPM machine 1. The main body 10 can be a variety of shapes, it is not necessarily rectangular. The main body 10 contains aperture or apertures 12 that permit an arm or arms 30 to be connected on the interior of the main body 10 and extend into the interior of the main body 10 and extend outward away from the main body 10 in a direction substantially parallel to the ground. The main body 10 may be constructed of any suitable material so long as it is sufficiently strong enough to house the necessary components of the device and support the weight of a leg.

FIG. 1*a* shows a perspective view of one embodiment the hip CPM device 1 of the present invention. The hip CPM device 1 has a rectangular main body 10 on positioned on stand, base or legs 20 (used interchangeably herein). The main body 10 is generally a rectangular or square shaped housing which contains the motors, gears, belts etc., (not shown) that drive or direct the movement of the arm 30 or arms of the hip CPM device 1. The exact shape of the main body 10, however, is not critical and is generally shaped to contain the motor, gears, etc. and move the arm 30 or arms as required. The body 10 is also designed to be as compact as possible as the hip CPM device 1 is preferably portable.

The stand or base 20 provides support for the main body 10. The base 20 of the embodiment of FIGS. 1 and 2 is generally square shaped and constructed with four wheels 22 to make it easily transportable. Other shapes and functionalities are possible for the base 20 but in this embodiment the square pattern provides stability. The base 20 may be adjustable in the vertical direction to allow the height of the main body 20 to be adjusted. The base or stand 20 may be collapsible or foldable in order to make the hip CPM device even more compact and easier to transport.

Figure 1B:
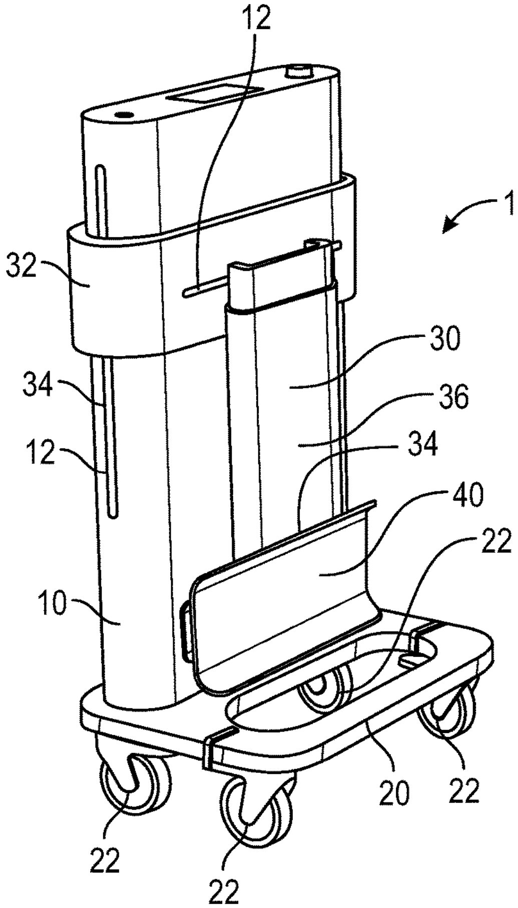
Figure 2B:
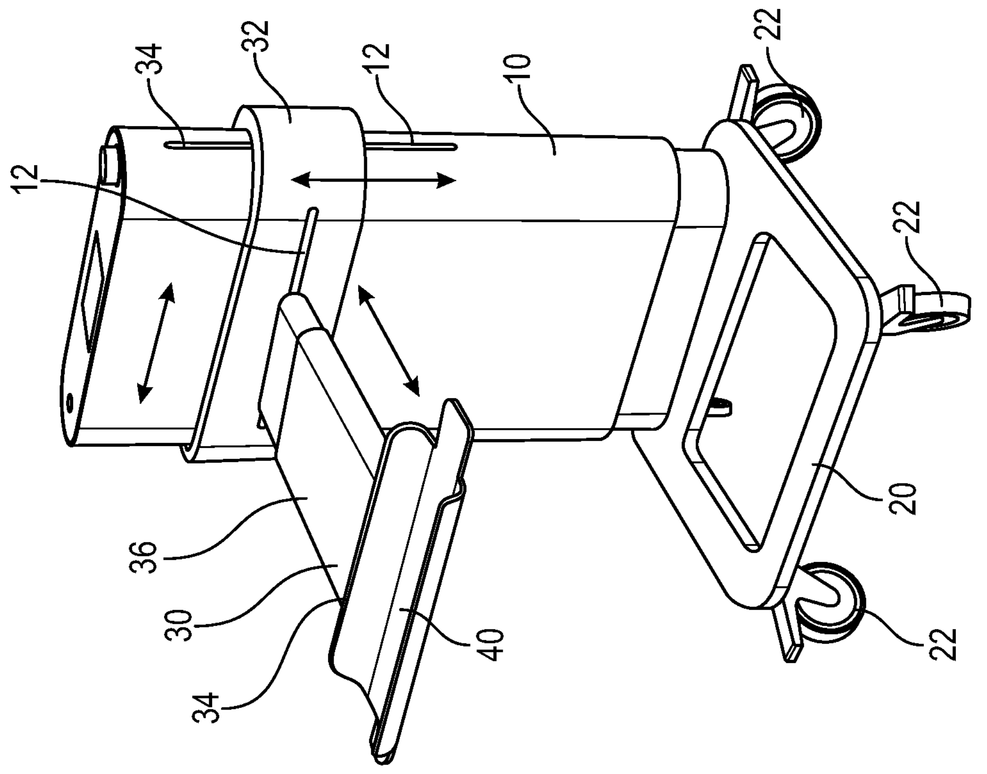
FIG. 2A-D show perspective views of a single arm embodiment with the arm in various positions along the XYZ axis.
Figure 2A:
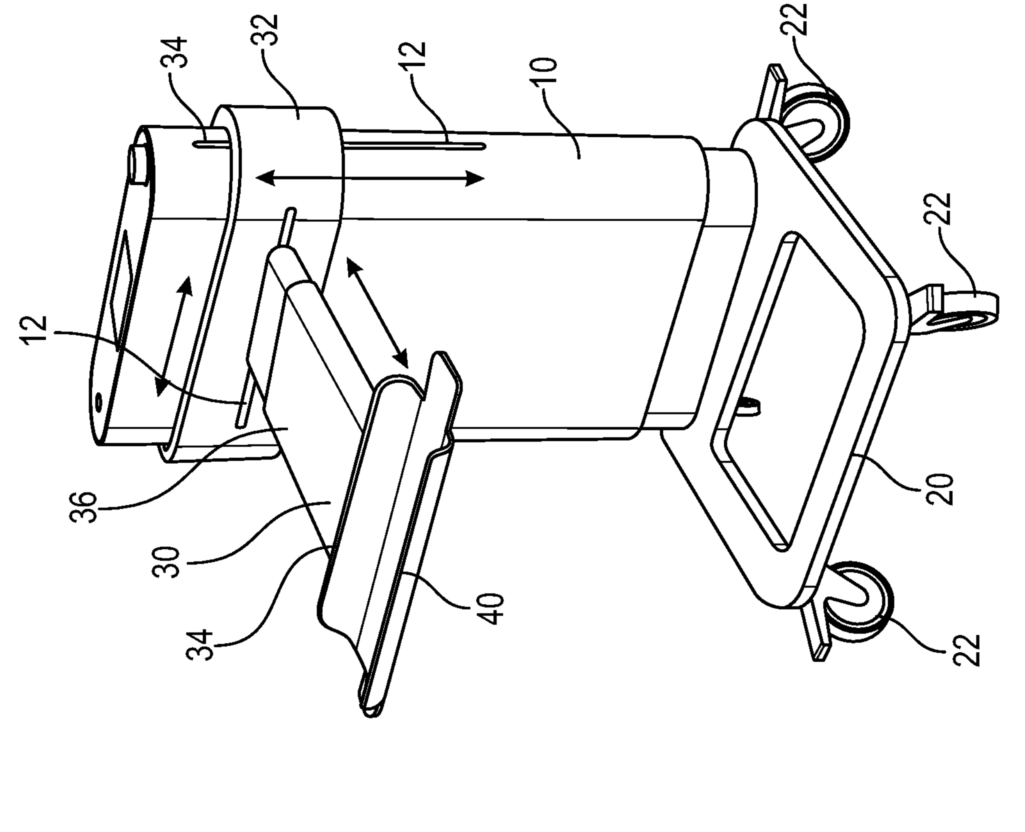
Figure 2D:
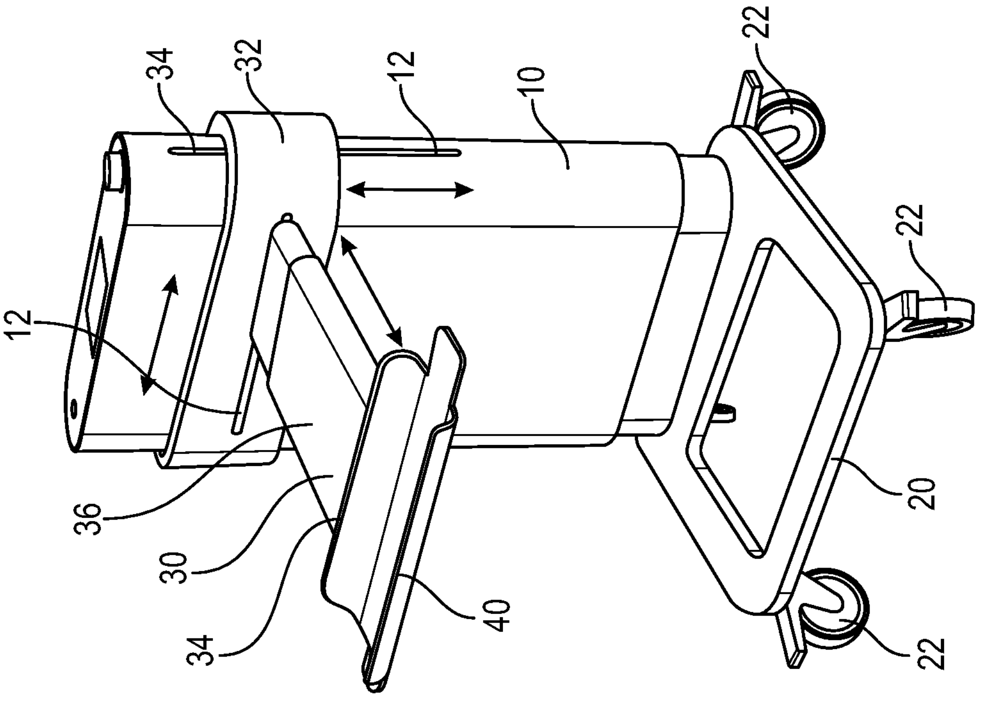
Figure 2C:
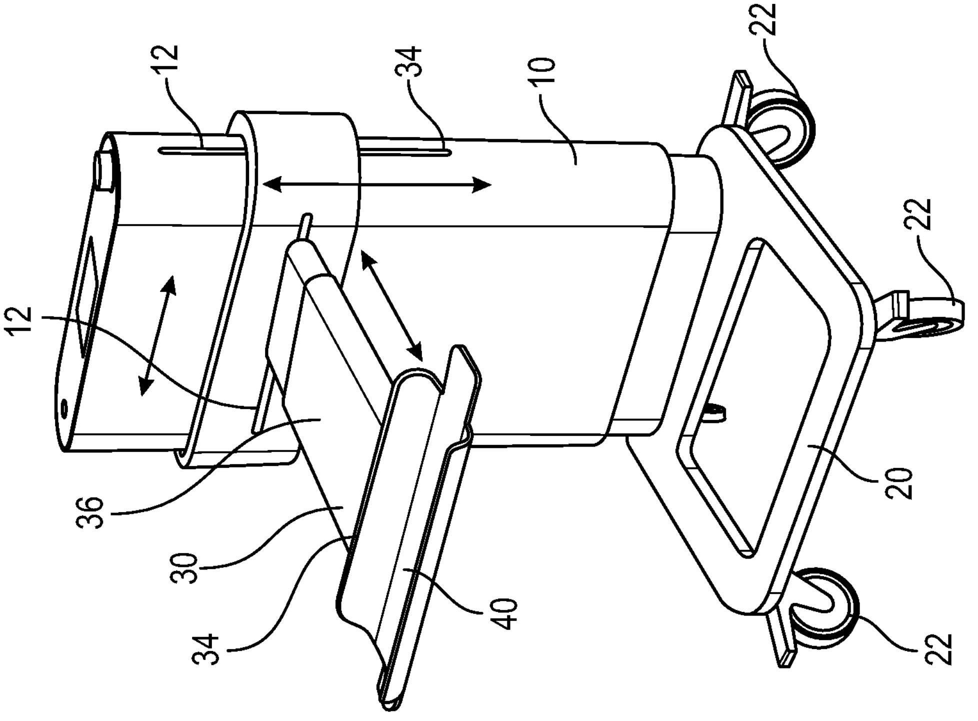

The device contains one or more robotic arms 30 extending from the main body 10 of the machine 1. FIGS. 1A and FIG. 1B show an embodiment of device with one robotic arm 30 attached to the main body 10. FIG. 1B shows the arm 30 in the folded position generally flush against the body 10 of the device 1 for ease of storage and transport.

As discussed below, embodiments with more than one arm are envisioned. The robotic arm 30 hold and support the operative leg (not shown) at an area or areas of the leg to fully support the weight of the operative leg. The arm or arms 30 preferably extend out from the main body 10 of the device 1 substantially parallel to the ground and perpendicular to the main body 10. The arm or arms 30 are preferably of adjustable length so that the arms 30 can reach the patient when the main body 10 of the device 1 is on the floor and the patient is on a table or other support.

The arm 30 is attached or connected to the main body 10 via a band or sleeve 32 that substantially encircles the main body 10. The band or sleeve 32 moves up and down the height or a portion thereof of the main body 10, thereby moving the arm 30 in the up and down direction, shown with an arrow. The arm 30 moves in the up and down direction via the band 32. The band 32 is guided by vertical slots or channels 14 on the sides of main body 10. The band 32 is connected to an actuator and or motor assembly on the interior of the main body 10, which moves the band 32, which in turn moves the arm 30. The arm 30 can further move side-to-side and in-and-out with respect to the main body 30. Arrows illustrated how the arm 30 can move along three different axes with respect to the patient, thereby moving the patient's leg in three dimensions. The arm 30 can move in a side-to-side direction with respect to the body guided by horizontal slot 34 in the band 32. Finally, the arm 30 can move in the in and out direction with respect to the body 10. In this embodiment, the arm 30 has a telescopic sleeve 36 that moves the hand 40 in the in and out direction. The arm 30 can be programmed to move in both directions, i.e., clockwise and counterclockwise manner.

FIGS. 2A-D show the various movements and positions of the arm 30 in operation.

Each arm 30 has a hand 40 attached to the end 34 of the arm 30. The hand or hands 40 are shaped such that it can securely support the patient's leg but also move the patient's leg as the arm or arms 30 of the machine 1 move. Preferably the hand 40 is concave or U or V-shaped. Even more preferably the hand is adjustable to accommodate patient's legs of the different shapes and sizes. The hand 40 may be secured directly to the end 34 of the arm 30 as shown in the embodiment of FIGS. 1 and 2. The hand 40 and arm 30 are elongated in this embodiment as there is one point of contact with the patient's leg. The elongated hand 40 allows for the leg to sit comfortably atop the concave shaped hand 40 and be gently secured by the hand 40.

Figure 6:
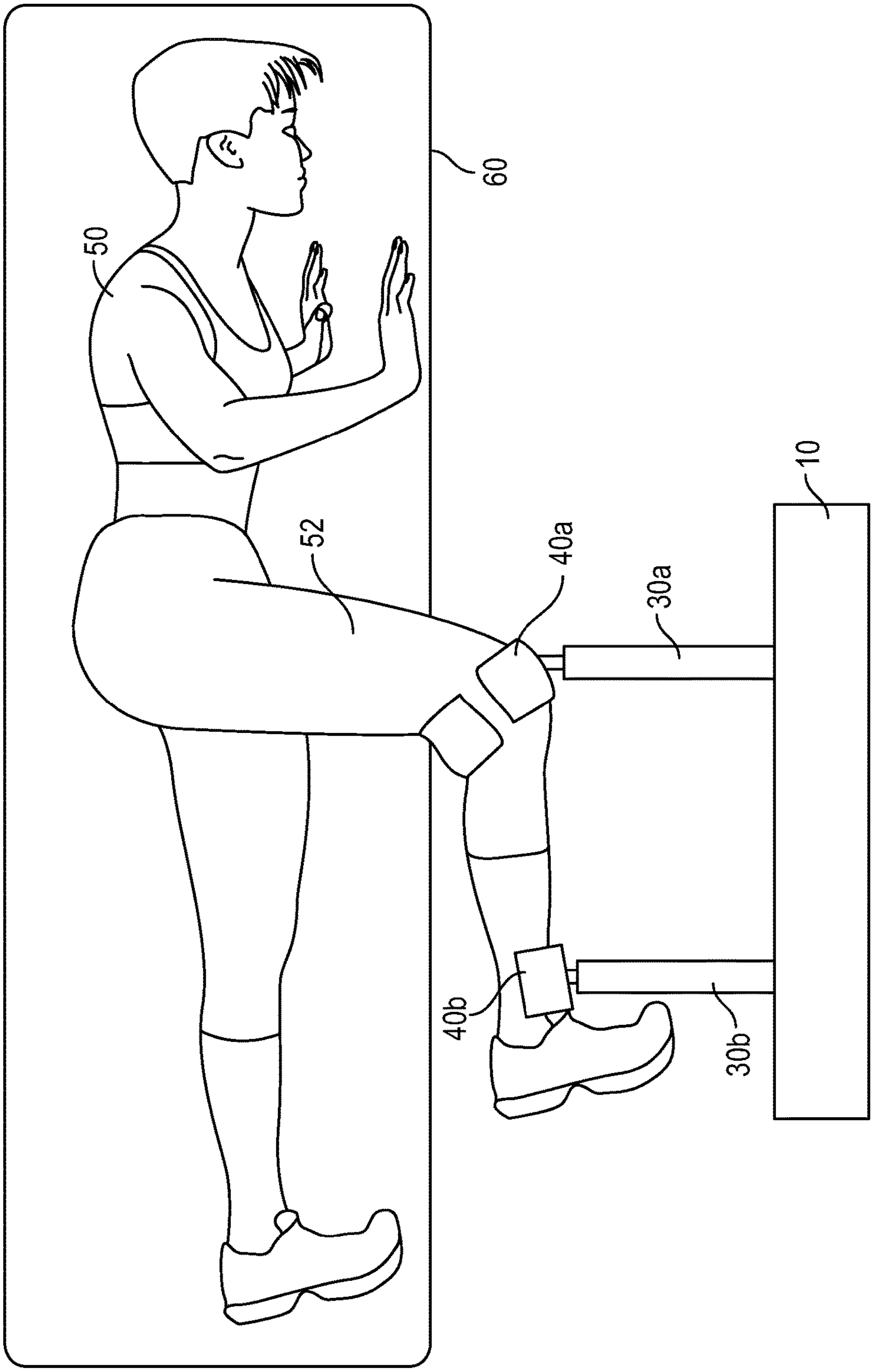

Alternatively, the hand 40 may be secured to the end 35 of the arm 40 by way of a joint or swivel to accommodate the movement of the arm 30 as illustrated in FIG. 6. In one embodiment, where there is more than one arm 30, the hands 40 swivel laterally so that hands 40 do not twist or lose hold of the patient's leg 52 as the arms 30 of the machine 1 move.

Figure 3A:
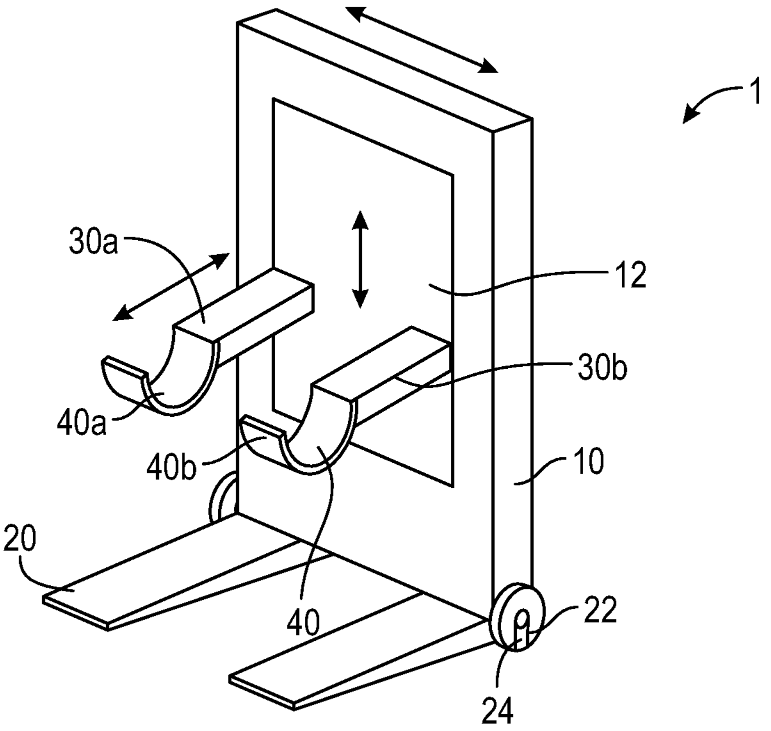
FIGS. 3A and B show a perspective and side view of a two-arm embodiment of the hip CPM machine of the present invention.
Figure 3B:
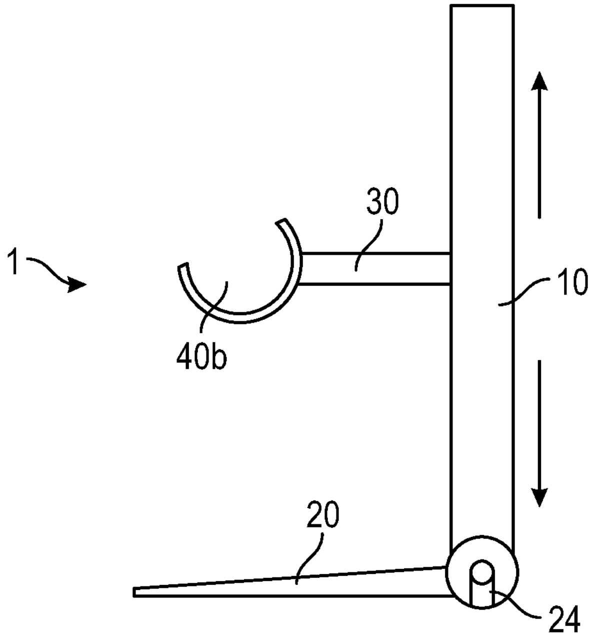

FIGS. 3A and 3B show another embodiment of the hip CPM device 1. This embodiment has two arms 30*a* and 30*b* instead of one larger arm 30. The two arms 30*a* and 30*b* hold or support the leg in two positions but the principal is the same. The arms 30*a* and 30*b* move in three dimensions to provide the leg movement in a circumduction manner as well as into hip flexion/extension. The movement can be provided in both directions (a clockwise and counterclockwise manner). In operation the arms 30*a* and 30*b* are adjusted to hold the patient's leg at a first position on the distal thigh, preferably just above the knee (not shown). The leg is held at a second position on a point on the distal shin, preferably just above the ankle. The exact position at which the leg is held though may vary depending on the specific treatment. The arms 30*a* and 30*b* of the device 1 also provides foot support so that the foot maintains proper alignment with the lower leg while in operation. In this embodiment, the arm 30*a* is connected to the ankle with an optional boot type attachment (not shown) so that the foot can be held and supported in a neutral ankle posture. The two arms 30*a* and 30*b* can move in tandem or independently along the three axial planes (X,Y,Z). The combined motion can be configured to the specific needs and shape of the individual patients. The apertures 12 in the main body are shaped to provide enough space to permit the arms 30*a* and 30*b* to move as required in the three axial planes.

FIG. 3B is a side view of the machine 1 illustrating the side of one arm 30*b*, the side of the main body 10, and the legs 20 which extend from the lower portion of the main body 10. The hands 40*a* and 40*b* are attached respectively to arms 30*a* and 30*b*.

In one embodiment, the movement generated by the machine 1 allows for the robotic arms to travel different distances (thigh arm vs lower leg arm) and the movements coupled (along more than one axis of movement at a time) in order to replicate human motion. In operation of this embodiment, the two arms 30*a* and 30*b* simulate human movement via the robotic arms 30*a* and 30*b* and the programmed movement. The arms 30*a* and 30*b* in this embodiment do not have to move in tandem, but the excursion/distance moved by each arm will be different, just as the movement of the arms of a human would be different.

Figure 4:
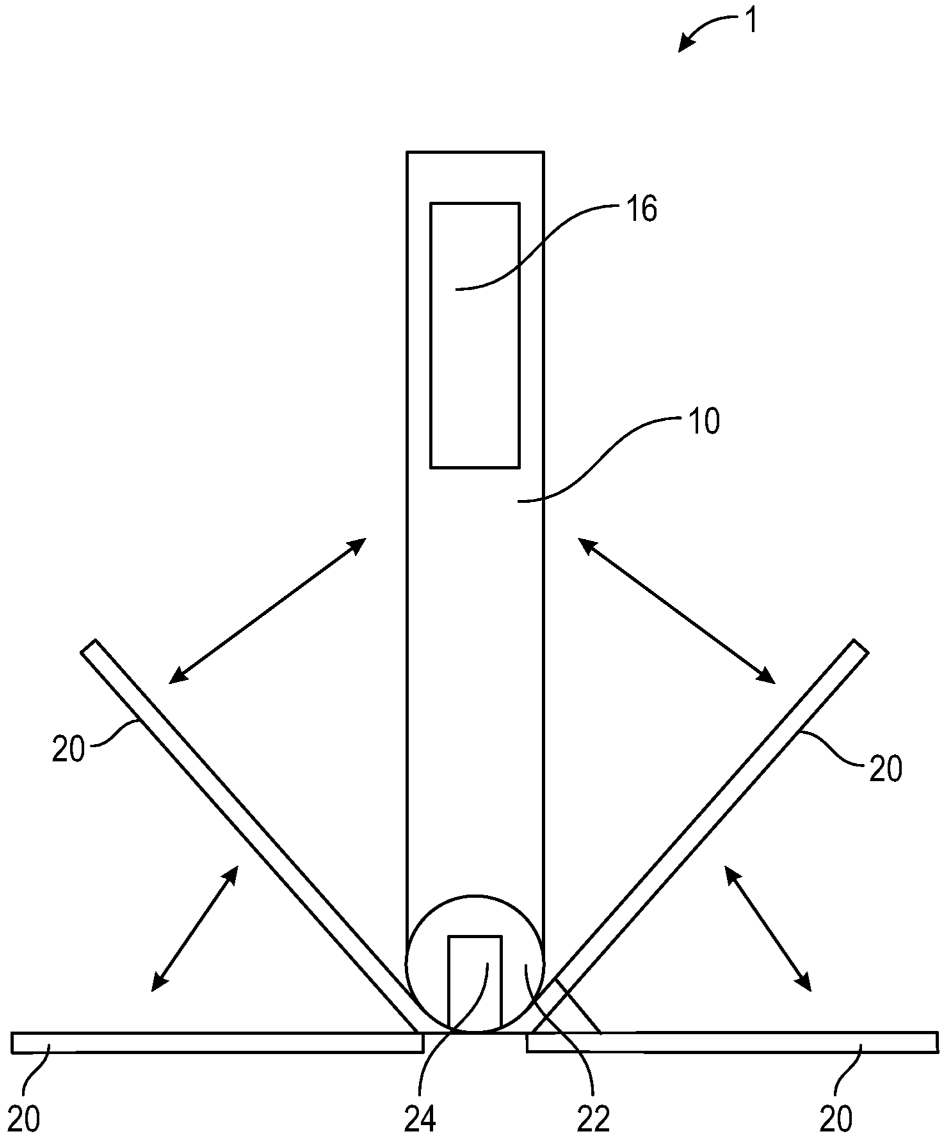
FIG. 4 is a perspective and side view of an alternate embodiment of the CPM machine of the present invention with showing different positions of the stand.

In use, the hip CPM machine 1 will typically be positioned on the floor or other secure support. FIG. 4 illustrates the side view of the CPM machine with the legs in different positions to show how the legs are moved from a compacted position for transport to a position for use. FIGS. 3A and 3B shows the arms 30 extended out toward a patient (not shown) with the hands 40 attached to the patient end of the arm.

The base, stand or legs 20 are secured to the bottom portion 12 of the main body 10. The base, stand and/or legs 20 are preferably adjustable and contains anti-tipping kickstands or supports 24 that can be locked in positions (shown in FIG. 4). As shown in FIG. 4 the legs 20 can fold from the floor to be flush with the main body 10. In this embodiment, the legs 24 extend from both the front and back of the main body 10 for stability. Preferably the stand or supports 24 fold in/out of the base 20 or wheels 22 of the device 1 so that the device 1 can be transported easily. The exact configuration of the stand and legs 20 are not critical and may be varied so long as the stand provides the stability to the machine 1 such that the arm or arms 30 can withstand the weight of the patient's leg without tipping over or wobbling while the arms 30 are in motion. In one embodiment, the device has two or more legs 20 that extend out perpendicular from the bottom portion 12 of the main body 10 and lie on the floor.

Figure 5:
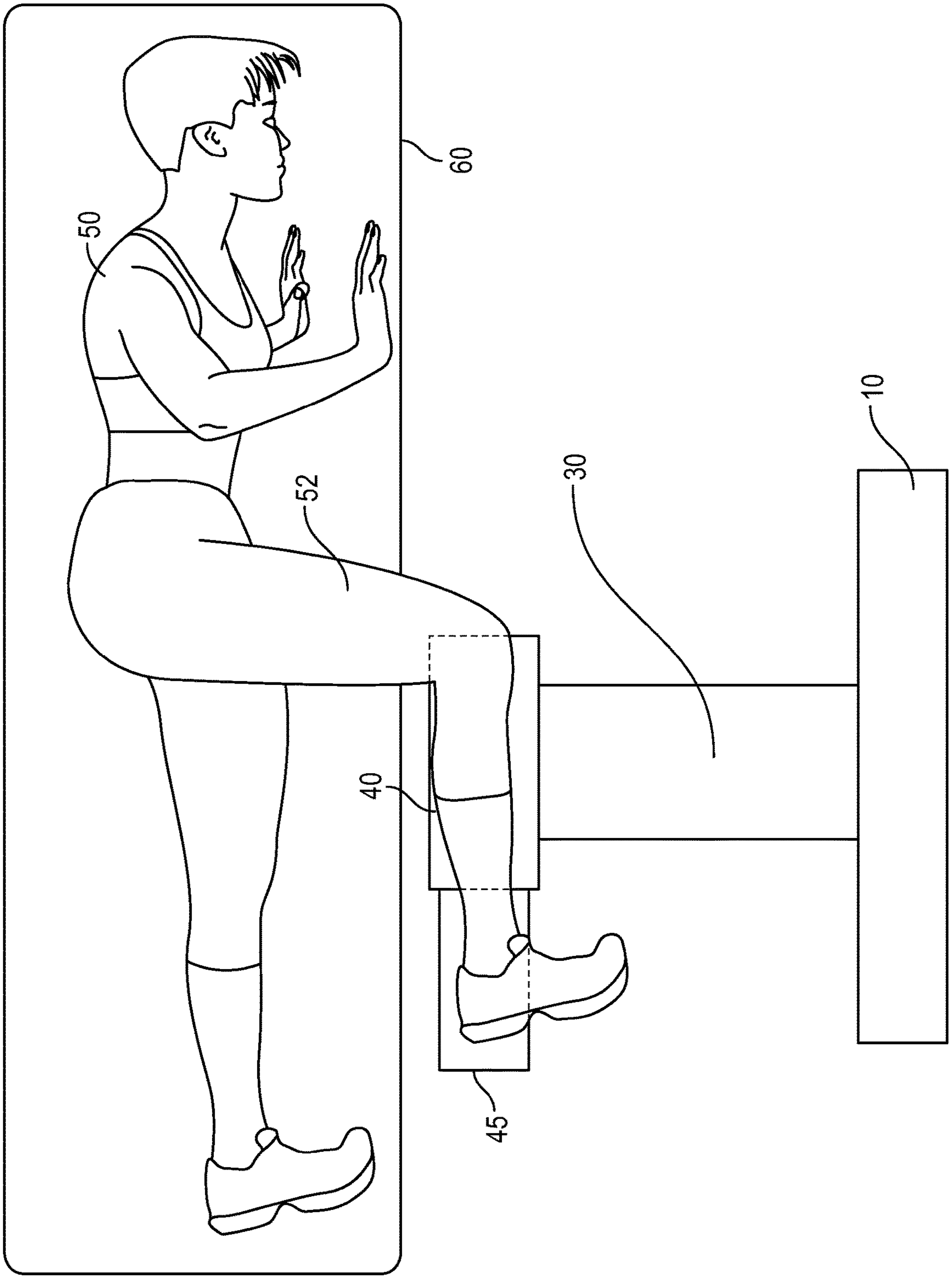
FIGS. 5 and 6 show top views of different embodiments of the CPM machine of the present invention with a patient engaged with the hands of the hip CPM machine.

FIGS. 5 and 6 illustrate top views of the hip CPM device 1 engaged with a patient. Embodiment of hip CPM devices 1 with different arms 30 for the one-armed embodiment of FIGS. 5 and 30*a* and 30*b* for the two-armed embodiment of FIG. 6. The hand 40 for the one-armed embodiment and hands 40*a* and 40*b* for the two-armed embodiment are illustrated from the top view. In both embodiments shown, the patient 50 is lying on his or her side on a table 60 or other suitable piece of surface. The operative leg 52 is the upward facing leg. In FIG. 5, the elongated hand 40 is supporting the patient's operative leg. An optional extender 45 extends from hand 40 to support the patient's 50 foot. In FIG. 6, the two hands 30*a* and 30*b* are engaged with and supporting the patient's operative leg 52 at two different positions on the leg. In the two-hand embodiment, one arm 30*a* is holding the leg 52 above the knee and one arm (the other arm) 30*b* in the area of the ankle and foot of the operative leg 52. Preferably the second hand 40*b* is positioned close to the ankle to provide some support for the foot. In this embodiment, the hands 40*a* and 4*b* can swivel with respect to the arms 30*a* and 30*b* as the leg 52 is moved into different positions by the arms of the hip CPM device 1. Generally, the hand or hands 40 can be shaped and configured to support the leg 52 and foot of the patient 52 as needed. In operation in either embodiment, the arm or arms move in three dimensional patterns (which is preprogrammed by the user or operator) to passively move the leg 52 in a therapeutic motion.

The primary components can be modified in numerous ways to achieve the desired function.

Figure 7:
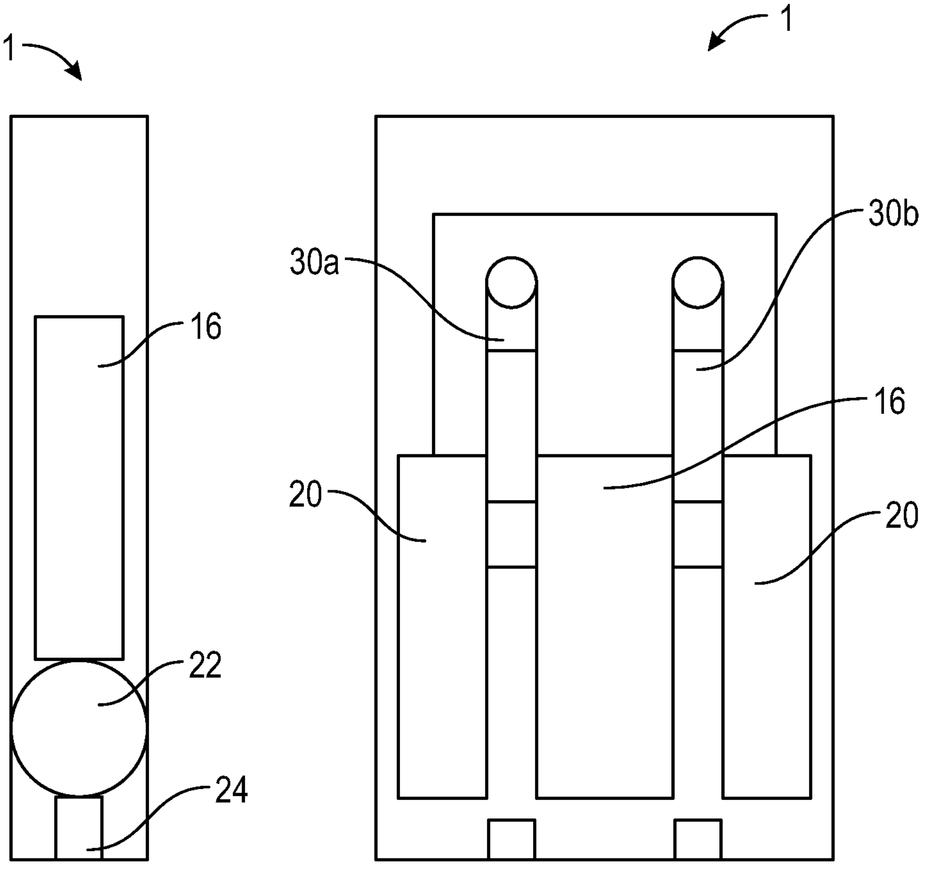
FIGS. 7A and 7B show a front and side view of an embodiment of the hip CPM machine folded up for easy transport and storage.

FIGS. 7A and 7B show the front and side view of an embodiment of the hip CPM machine 1 with arms 30*a* and 30*b* and legs/stands 20 folded toward the main body 10 for easy transport. An optional storage unit 16 is also included and illustrated in the front and side view.

Figure 8:
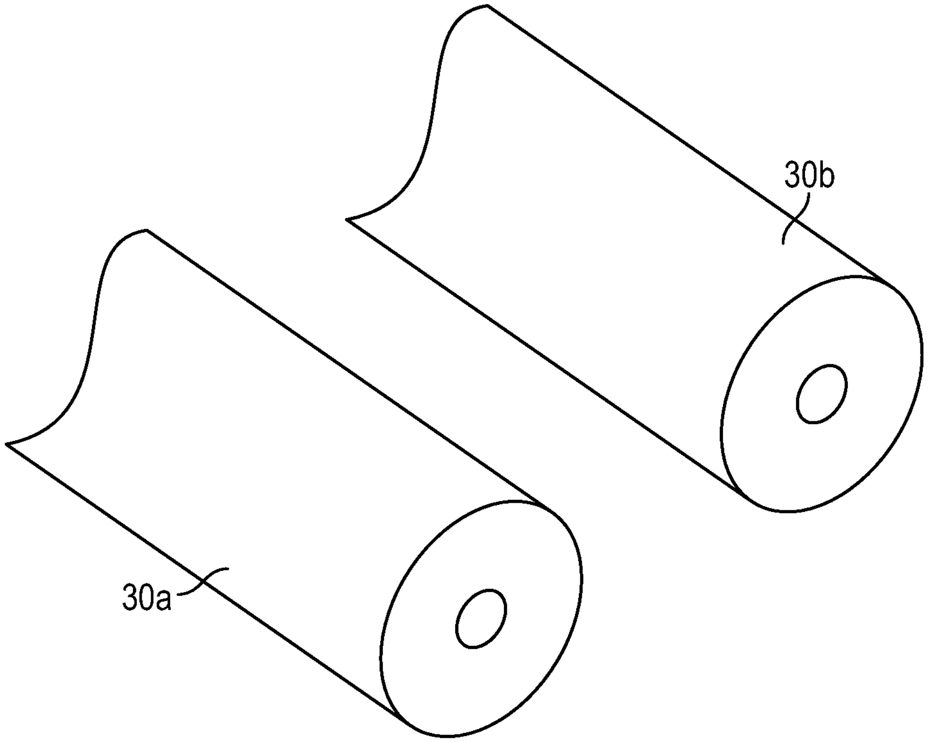
FIG. 8 illustrates a perspective view of an embodiment of the arms 30*a* and 30*b* without hands.
Figure 9A:
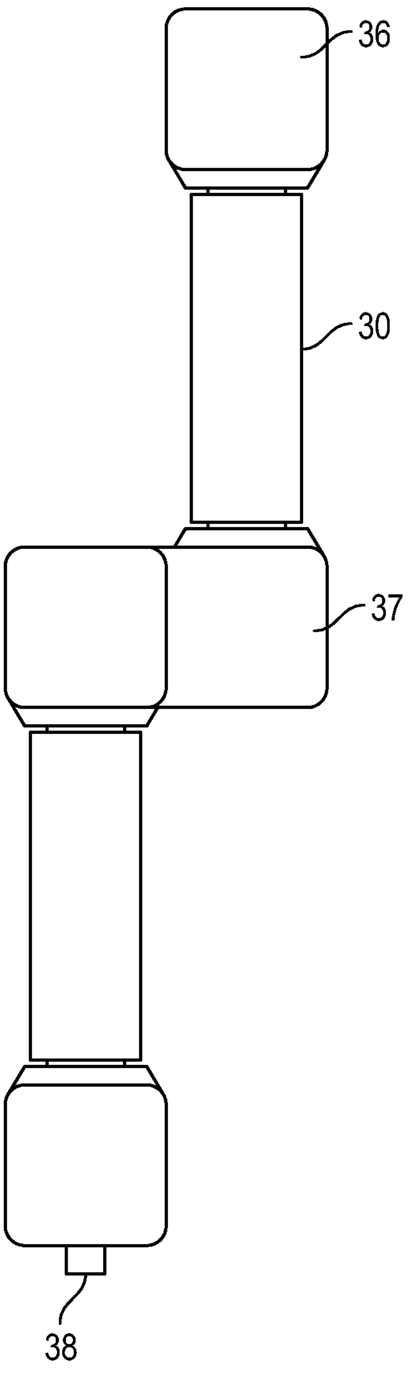
FIGS. 9A and 9B illustrate top view of an alternate embodiments of an arm 30.
Figure 9B:
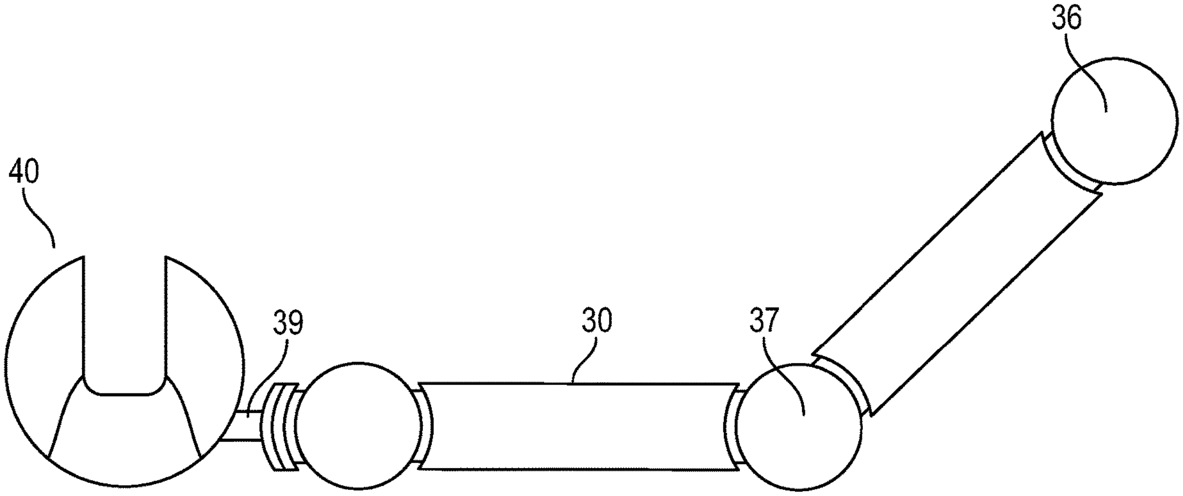

FIG. 8 illustrates a view of an embodiment of the arms 30*a* and 30*b*. The arms 30*a* and 30*b* are in a generally cylindrical shape although the cross-sectional shape can vary. The arms in some embodiments are substantially straight, such as in the embodiments of FIGS. 1-3. The arms however can have different configurations. FIGS. 9A and 9B illustrate top view of an alternate embodiments of an arm 30. On the one end of the arm there is a robot shoulder 36 which attaches to the interior of the main body 10 of the hip CPM device 1. On the other end is a robotic wrist 38, which attaches to a hand 40 (not shown). Both the robotic shoulder 36 and wrist 38 rotate 180° around the central axis of the arm. At the end of the wrist is an attachment rod 39 for the hands 40 to be attached. In one embodiment the attachment is a magnetic-type attachment, although other types of attachments are possible. Between the wrist 38 and shoulder 36 is a robotic elbow 37 which also rotates 180°.

Figure 10:
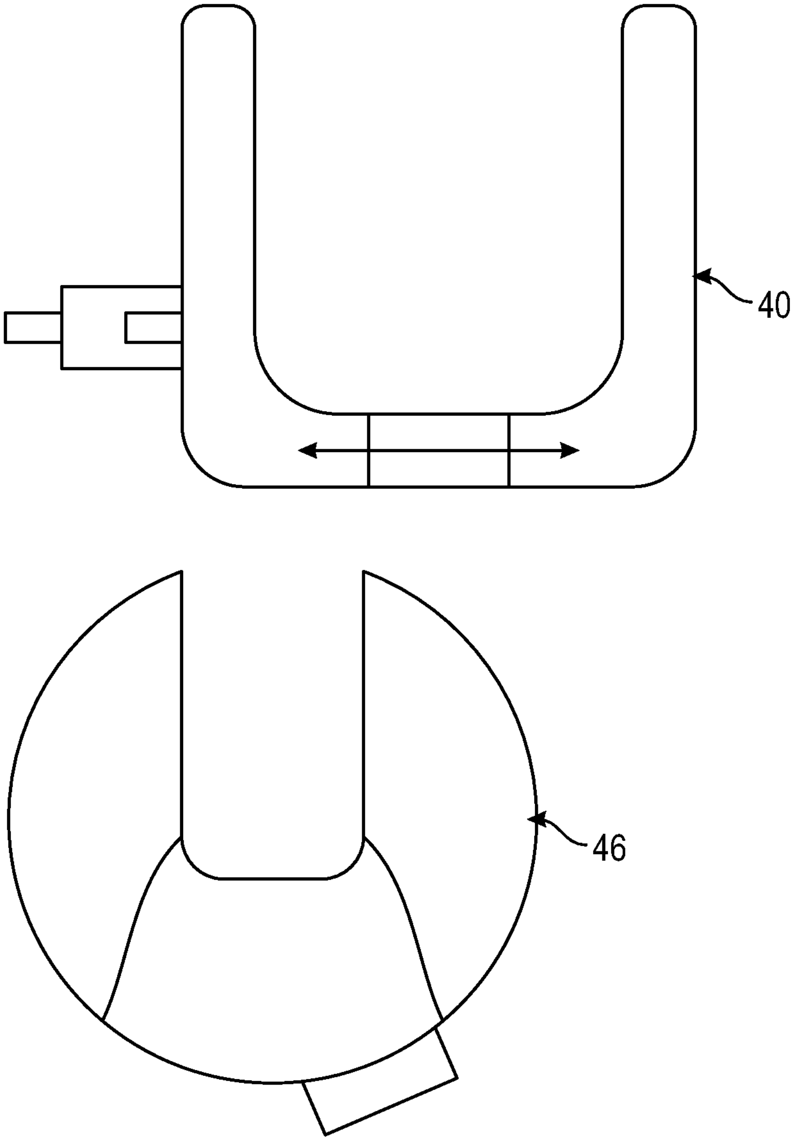
FIG. 10 shows a side view of different embodiments of the hands 40 which can be attached to the patient end of the arms 30.

FIG. 10 shows a side view of different embodiments of the hands 40 which can be attached to the patient end of the arms 30. The hands 40 can be removable or permanently attached and can be attached by a variety of means. The attachment method must be secure enough to hold the weight of the patient's leg. The hands 40 may be attached such that the hands 40 can swivel or pivot with respect to the arms 30 so as not to put undue pressure on the patient's leg as the patient's leg is being moved. In one embodiment, hands 40 are U-shaped but the shape can be any shape that holds or support the leg. In one embodiment the hands are adjustable to accommodate varying widths of the patient's leg. Optionally, the hands are padded for patient comfort. In one embodiment the hand 40 is specifically dimensioned for the knee area of the patient. In another embodiment, the hand 40 is structured to hold the ankle and foot of the patient. In this manner the foot will be held comfortably in a natural position during operation.

FIG. 9B shows a hand 40 attached to a robotic arm 30 via magnetic lock system. The hand in this embodiment is one designed to hold or support the knee area of the patient. It is interchangeable with other hands as necessary. The hand 40 in FIGS. 1 and 2, with one arm 30, is generally longer and does not swivel as it holds the leg at one position. The greater length of the hand 40 allows the patient's leg to rest comfortably across the hand 40.

In one embodiment, the device is programmable and allows for incremental changes in the amount of range of motion (ROM) provided to the leg 52. Preferably, the device includes a program storage device readable by the machine, tangibly embodying a program of instructions executable by the machine to cause the machine to move the arms of the machine in a prescribed motion. This is accomplished with integrated or even external software and hardware that drives the predefined motion of the arms 30 and hands 40 of the machine 1. Most typically, this would be accomplished with an integrated computer or the like receiving input from the user and transmitting signals to the actuator and/or motor controlling the arms. The specific path that the arm 30 is moved is defined by the operator and determined by the operator according to the specific needs of the patient.

This information and execution may be accessible via an application interface on a smart phone for example, which can be communicate with the device. The hip CPM device and/or the application may be set up for telemetry (data collection) of the patient for various parameters. The ROM provided may be correlated with post-operative protocol parameters, as per the medical provider's orders. The programmable device controls the direction, speed and special movement of each arm 30. Input parameters may include the height of the patient, length of the leg etc. so that the optimum movement is provided to the patient.

Preferably, the motion ranges accommodate the following types of movement and conditions, although other ranges are possible under certain situations. Since the hip will be held in a relatively neutral position for rotation, the arms can create the circumduction motion more so through the combined movements of hip flexion/extension and hip abduction/adduction. Hip abduction means that the thigh moves away from the body laterally. Hip adduction means that the thigh moves towards the midline of the body.

The resting/open-packed position of the hip is such that the hip is in about 5-8 degrees of abduction, so this would be our starting point with the thigh 5-8 degrees just north of the horizontal line. Preferably, the hip would not exceed 15 degrees of hip abduction during circumduction. With this limitation, the most adduction that would occur with the circumduction motion would be 25-30 degrees below the horizontal line. This angle will of course vary a bit based on the width of the patient's pelvis.

However, in other it is safe given post-operative precautions to slowly and gently bring the thigh towards the midline of the body especially if there are only 45 degrees of hip flexion occurring at the same time. This will be up to the medical professional to decide.

In the typical application for the typical patient, a medical professional may avoid a full 30 degrees of adduction while at 90 degrees of hip flexion. The motion range of the machine can be programmed accordingly. Again, these types of decisions will typically be determined by the medical professional according to the specific needs or the patient.

In some embodiments, the machine 1 will measure the weight of the patient's leg and determine the amount of force to exert to safely move the leg through its trajectory or path and the prescribed range of motion. The machine 1 in one embodiment uses a laser or similar technology to determine the proper position of the arms 30 and hands 40 to match the pelvic width of the patient. Through a mechanical, mechano-electrical and software engineering design, with an application interface, the side-lying hip CPM device 1 provides a customized intervention/treatment to the patient. Additionally, the app optionally provides telemetry so that data can be collected and analyzed.

The movement of the arms 30 can produced by any means know in the art. The means will typically be some type of actuator or motor or some combination of both. For one example an electric actuator or actuators is paired with a motor or motors to create the linear and/or rotary motion of the arms 30. Electric actuators are preferred as it tends to be more accurate, reliable and repeatable compared to hydraulic and pneumatic actuators. There's also less friction generated, which directly translates to less wear and tear and a reduction in the frequency of maintenance that is required. Electric actuators also provide a quieter operation, which can be especially helpful in-patient settings. The actuators and/or motors are coupled to the integrated or external computer.

There will be various modifications, adjustments, and applications of the disclosed invention that will be apparent to those of skill in the art, and the present application is intended to cover such embodiments. Accordingly, while the present invention has been described in the context of certain preferred embodiments, it is intended that the full scope of the invention be measured by reference to the scope of the following claims.

What is claimed is:

1. A continuous passive movement (CPM) machine for movement of a patient's leg comprising:

a main body;

one or more arms extending from the main body and each arm movable along three (X, Y and Z) axes with respect to the main body;

a hand attached or extending from an end of each arm of the one or more arms wherein each hand is structured to support the leg of the patient;

wherein the one or more arms are programmable to move such that motion of circumduction as well as linear hip flexion/extension of the patient's leg is provided to the patient;

wherein the one or more arms are connected to the main body by a band that substantially encircles the main body, wherein the band is configured to move up and down at least a portion of a height of the main body.

2. The CPM machine of claim 1, wherein each of the one or more arms is independently movable from the other arms.

3. The CPM machine of claim 1, further comprising a stand for securing the main body in position with respect to the patient.

4. The CPM machine of claim 1, wherein each hand is connected to one arm of the one or more arms by way of a swivel joint.

5. The CPM machine of claim 1, further comprising a program storage device readable by the machine, tangibly embodying a program of instructions executable by the CPM machine to cause the CPM machine to move the one or more arms of the CPM machine in a prescribed motion.

6. The CPM machine of claim 5, wherein the program storage device is programmed to interface with a smart phone via an application.

7. The CPM machine of claim 1, wherein the one or more arms includes there is only one arm.

8. The CPM machine of claim 1, wherein the one or more arms are configured to move back and forth along at least a portion of a front length of the band.

9. A continuous passive movement (CPM) machine for movement of a patient's leg comprising:

a main body;

a single arm extending from the main body movable along three (X, Y and Z) axes with respect to the main body;

a hand attached to an end of the single arm configured to support the leg of the patient;

wherein the single arm is programmable to move such that motion of circumduction as well as linear hip flexion/extension of the patient's leg is provided to the patient;

wherein the single arm is connected to the main body by a band that substantially encircles the main body, wherein the band is configured to move up and down at least a portion of a height of the main body.

10. The CPM machine of claim 9, wherein the hand is concave shaped and longer than a width of the single arm.

11. The CPM machine of claim 9, wherein the single arm is configured to move back and forth along at least a portion of a front length of the band.

12. The CPM machine of claim 9, wherein the hand is configured to move along at least a portion of a length of the single arm.

* * * * *